Patented Jan. 30, 1940

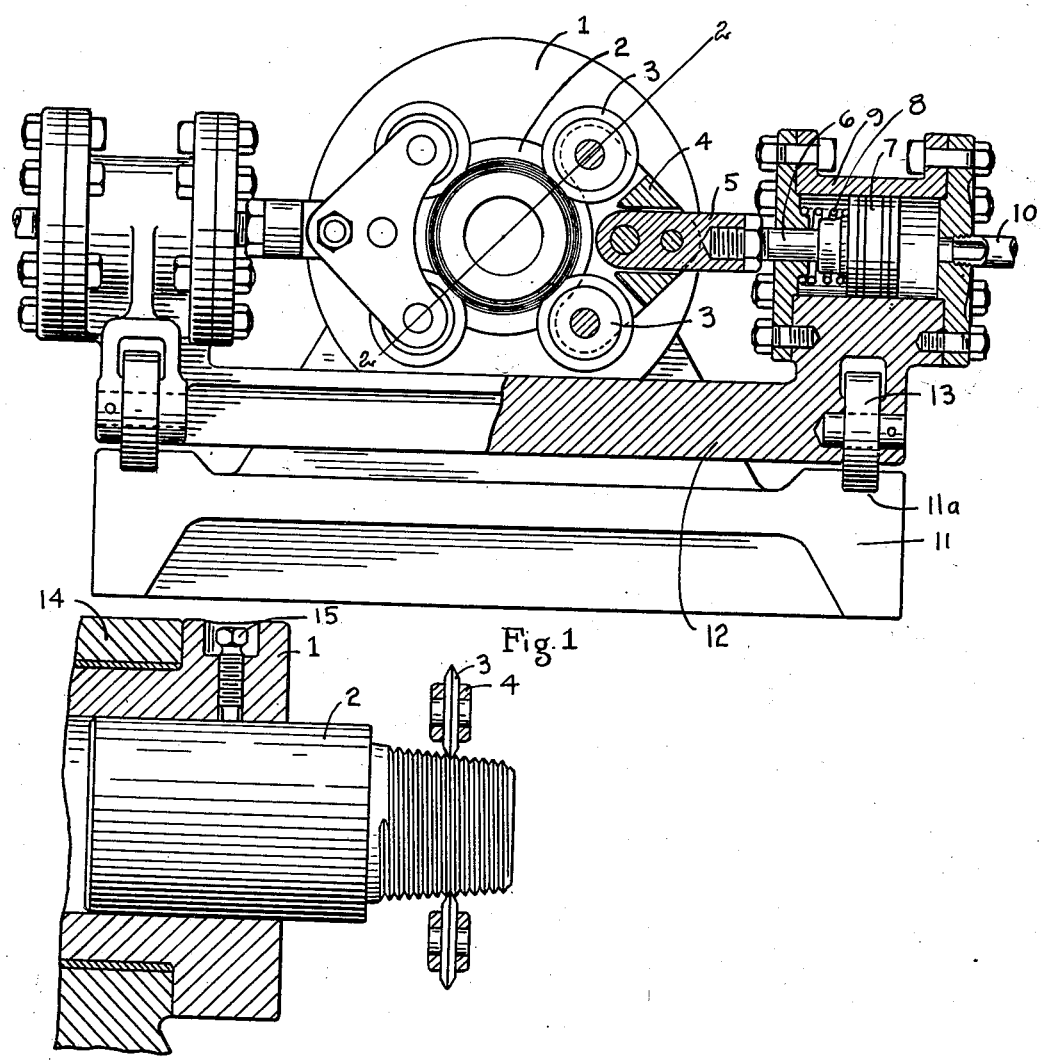

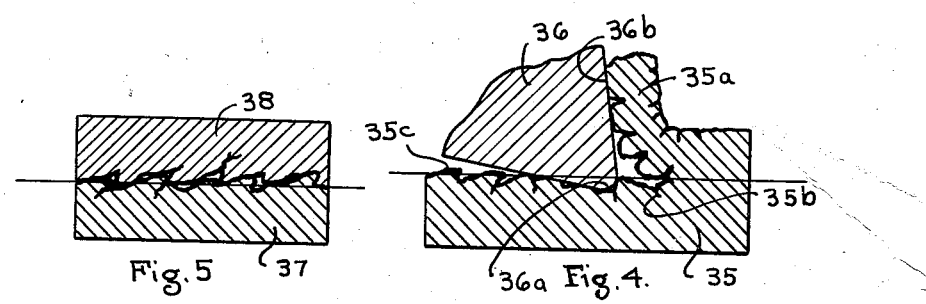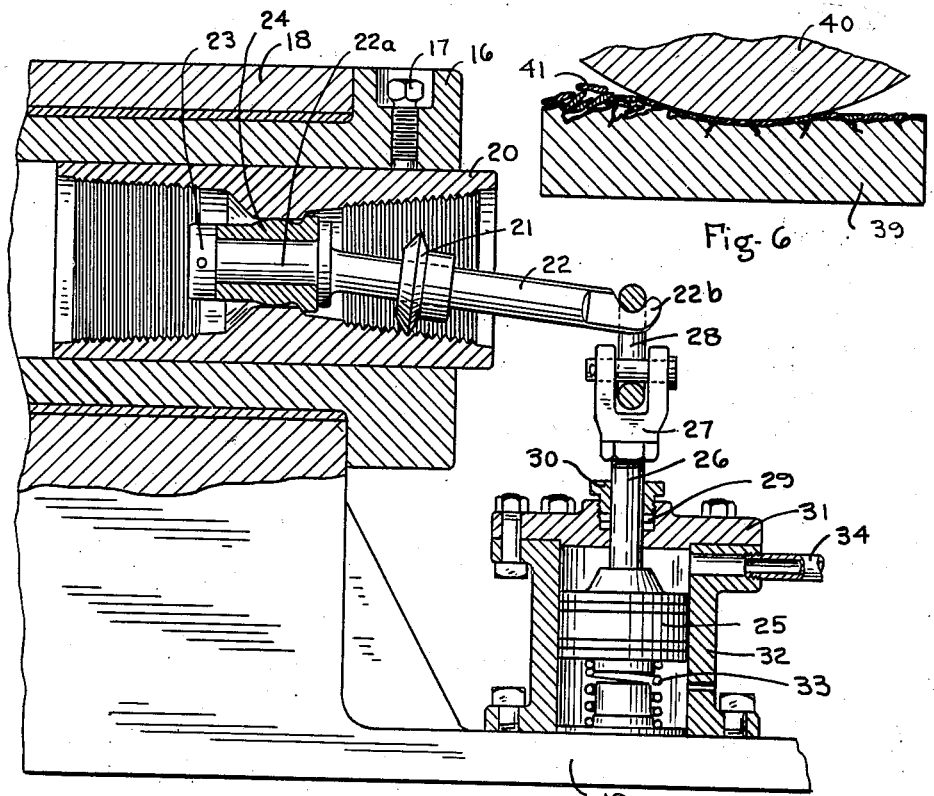

2,188,629

UNITED STATES PATENT OFFICE 2,188,629

BURNISHING MACHINE

Russell H. Giesey and Guy E. Behnke, Oklahoma City, Okla.; said Giesey assignor of one-half of his right to Clarence E. Reed, Wichita, Kans.; Dorothy E. Giesey, executrix of said Russell H. Giesey, deceased Application January 9, 1937, Serial No. 119,887

2 Claims. (Cl. 29—90)

The invention concerns apparatus for smoothing tapered screw threads of tool joints. As an instance of an article in which the invention may be used, the joints of drill stems or pipes used in earth boring apparatus for making oil wells may be mentioned. These drill stems are made up of pipe sections, usually 20 to 30 feet long connected together by special screw threaded couplings known as tool joints. The members of these joints have screw threads in one end to screw onto pipe sections which they are to connect and at their other ends they are screw threaded so that one member of the joint can be screw threaded into the other member, the last mentioned threading being coarse, usually about four per inch. In a drill stem employed in present day practice, which may be several thousand feet in length many tool joints are used. In removing a drill stem from a well it is necessary to disconnect the stem section by section, and it often happens that because some of the tool joints have become "frozen" it is impossible to disconnect them without stripping the screw threads.

We have found that the trouble is due to the character of the contacting portions of the screw threads which, because of the roughness or protuberances left thereon by the threading operation interlock with each other and resist unscrewing to such an extent that stripping of the threads will take place if enough force is applied to effect a separation.

These tool joints are made of alloy steel, heat treated, and are expensive and their destruction so far as their further use as connecting means is concerned involves material financial loss.

The means for carrying out the invention is shown in the accompanying drawings in which:

Fig. 1 is an end view of the apparatus partly in section for rolling the external threads of a tool joint section.

Fig. 2 is a sectional detail view on line 2—2 of Fig. 1.

Fig. 3 is a view partly in section and partly in elevation of the apparatus for rolling internal threads of a tool joint section.

Fig. 4 is a diagram of a cutting tool, in section together with a portion of the joint being threaded by said tool illustrating how the material is being torn and left with hook-like formations on its surface due to the action of the cutting tool in making the thread, it being understood that the section is taken lengthwise of the thread which is diagrammatically represented as straight instead of curved for convenience of illustration.

Fig. 5 is a diagrammatic view of the inner and outer members of the tool joint illustrating the manner in which the rough threaded portions of the contacting screw threads of said members interlock and produce a "frozen" condition of the joint, the section being along the screw thread and not across it.

Fig. 6 is a diagrammatic view in section of a roller smoothing down the hooked or rough portions left by the cutter.

In Figs. 1 and 2 a chuck is shown at 1 for holding the member 2 of the tool joint, which is clamped in place by a screw 15. This chuck is rotated by any suitable means and during the revolution of the tool joint member 2 rollers 3 having peripheries V-shaped in cross section are made to bear on the surfaces of the screw threads and smooth them down from the conditions indicated in Figs. 4 and 5 to the condition shown in Fig. 6, so that there will be no projections or hooks on the threaded portion of the tool joint member which would interlock and prevent turning of one member relative to the other for their disengagement. There may be four of these smooth surfaced rollers 3, as indicated in Fig. 1. They are carried by brackets 4 on arms 5 attached to piston rods 6 of pistons 7 which pistons work in cylinders 9, subject to pressure fluid through pipes, one of which is shown at 10. A spring 8 restores the piston to normal position. Under the pressure within the cylinders the four smoothing rollers move towards each other in pairs and thus roll down the protuberances existing along the screw thread as a result of the action of the cutter in forming said thread. The base of the machine is shown at 11, and at 12 is shown a carriage which has rollers 13 running in tracks 11a so that the chuck carrying the tool joint member 2 will be allowed to move as according to the pitch of the screw thread engaging the smoothing rollers. A bearing for the chuck is shown at 14, Fig. 2.

The above apparatus smooths down the externally disposed screw thread of the member 2.

In Fig. 3 is shown a part of the apparatus for smoothing down the surfaces of the internal screw threads of the other member (box end) of the tool joint with which the member 2 is to be connected by the external screw threads of 2 engaging one of the sets of internal screw threads of the box end 20. This box end is held in a rotary chuck 16 which is turned by any suitable means to present the internal screw thread to the smoothing roller 21, which has a smooth periphery of V-shape to fit the said internal screw thread of the member 20. This member is held in the chuck 16 by clamp screw 17. The chuck turns in the bearing 18. The base of this apparatus is shown at 19. The smoothing roller 21 is mounted on a rod 22 having an end portion or mandrel 22a resting in a bearing member 24 engaging by its globular portion the wall of the restricted bore of the member 20 of the tool joint. A collar 23 is pinned on the mandrel extension 22a of the rod 22 and contacts the end of the bearing block 24. The rod 22 has a hooked end 22b engaged by a link 28 which also connects with a forked member 27 on a piston rod 26 of a piston 25 suitable packing 29 and a gland 30 being provided to prevent leakage of pressure fluid. The piston 25 works in a cylinder 32, under pressure of fluid let into the cylinder through pipe 34. A spring 33 operates the piston reversely to the direction that the pressure fluid from pipe 34 operates it. The cylinder head is indicated at 31.

Under the pressure of the fluid in cylinder 32 the piston 25 is forced downwardly and through piston rod 26, coupling 27 like 28 and rod 22 the smoothing roller 21 is pressed into the internal screw threads and smooths out any roughness existing thereon as the tool joint member is turned by the chuck. In the form of the apparatus shown in Fig. 3 the chuck with the work piece has no movement in the direction of its axis but the tool for smoothing the screw threads does have movement in the direction of its axis. For this purpose it is slidable on the rod 22 and as the work piece is rotated by the chuck the smoothing device by engaging the threads, traverses the socket from end to end of its threaded portion.

In Fig. 4 which represents, in section, diagrammatically the material of the tool joint member is shown at 35. The cutting tool which cuts the screw thread is shown at 36. The chip raised from the body of the tool joint member during the cutting operation is shown at 35a. At 35b is indicated the cracks produced in the surface of the screw thread being cut, it being understood that this section is taken along, not across, the screw thread, and it is further understood that for convenience of illustration the piece being operated on is shown as though straight surfaced instead of curved. The hooked over portions or mounds left by the cutting tool dragging over the high places is indicated at 35c. The rounded edge assumed by the cutting tool after a period of use is shown at 36a and 36b represents the angular front face of the cutting tool.

In Fig. 5, 37 and 38 represent the inner and outer bodies of the tool joint sections one within the other and the interlocking effect of the roughened or hooked surface of said members causing them to "freeze" together, it being understoood that this view being in the nature of a diagram the contacting surfaces are shown in a straight line instead of curved.

In Fig. 6, 39 represents a body portion of a tool joint section, like either that at 2 or 20, and 40 represents a smoothing roller substantially the same as shown at 3 or 21 for smoothing out the surfaces of the screw thread of said body portion. At 41 is shown flakes of graphite with which the surfaces of the screw threads are coated or "plated" by the action of the smoothing tool or roller.

To briefly outline the operation of the apparatus of Fig. 1: The machine is started, revolving the tool joint to the left. The carriage is set so that the rollers will engage the threads at the large end of the tool joint. Fluid pressure is applied to the pistons which forces the rollers into engagement with the screw thread. The rollers following the threads feed the carriage outwardly to the end of the threads. The fluid pressure is then released and the springs force the piston back. The carriage is then brought back to the starting point and the process is repeated.

During the rolling operation graphite and oil is applied to the threads. This not only acts as a lubricant for the smoothing rollers, but the graphite is also rolled onto the surface of the threads plating them with a proper lubricant that assists in causing the thread surfaces to slide over one another instead of interlocking when pressure to unscrew the members is applied.

A similar operation takes place in Fig. 3, but in connection with the internal threads of the box end, or tool joint member 20.

In Fig. 2, it will be understood that the member 2 at its left hand end has an internal screw thread to screw onto the pipe section forming part of the drill stem. It will be further understood that the member 20 of the tool joint has at its right hand end a socket, the screw thread of which is complementary to the right hand end of the tool joint member 2 of Fig. 2 while at the left of member 20 in Fig. 3 there is an internal screw thread to receive one of the drill stem sections.

We claim:

1. A machine for smoothing tapered screw threads of a tool joint, comprising a chuck for supporting said tool joint, a burnishing roller adapted to engage the screw threads for removing protuberances therefrom, pressure means for forcing said roller radially against the threads, means for rotating said chuck and tool joint, means for supporting said roller for movement lengthwise of the tool joint in response to motion imparted to it by the rotating threads, said pressure means being resilient to accommodate the roller to the variations in the diameter of the thread.

2. A burnishing machine for smoothing the threaded portion of a member having a tapered screw thread, comprising a holder for said threaded member, a plurality of circumferentially spaced smoothing rollers, all of which are positioned to engage said threaded portion within the limits of a single turn of thread, a support for said rollers, resilient means interposed between said support and rollers for holding the latter in yieldable contact with the screw threads and permitting the rollers to move radially to allow for variation in the diameter of the thread, and means for imparting relative rotary movement between said holder and support, said holder and support being connected for relative axial movement therebetween.

RUSSELL H. GIESEY.
GUY E. BEHNKE.